(12) United States Patent
Yamaji et al.

(10) Patent No.: US 11,121,368 B2
(45) Date of Patent: Sep. 14, 2021

(54) POSITIVE ELECTRODE MATERIAL FOR NONAQUEOUS ELECTROLYTE SECONDARY BATTERY AND METHOD FOR PRODUCING THE SAME, AND POSITIVE ELECTRODE COMPOSITE MATERIAL PASTE, AND NONAQUEOUS ELECTROLYTE SECONDARY BATTERY

(71) Applicant: SUMITOMO METAL MINING CO., LTD., Tokyo (JP)

(72) Inventors: Koji Yamaji, Niihama (JP); Taira Aida, Niihama (JP); Ryozo Ushio, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 243 days.

(21) Appl. No.: 15/779,451

(22) PCT Filed: Oct. 31, 2016

(86) PCT No.: PCT/JP2016/082205
§ 371 (c)(1),
(2) Date: May 25, 2018

(87) PCT Pub. No.: WO2017/090378
PCT Pub. Date: Jun. 1, 2017

(65) Prior Publication Data
US 2018/0261873 A1    Sep. 13, 2018

(30) Foreign Application Priority Data

Nov. 27, 2015  (JP) .............................. JP2015-231220

(51) Int. Cl.
*H01M 10/04* (2006.01)
*H01M 10/0525* (2010.01)
(Continued)

(52) U.S. Cl.
CPC ............ *H01M 4/505* (2013.01); *C01G 41/00* (2013.01); *C01G 41/02* (2013.01); *C01G 53/006* (2013.01);
(Continued)

(58) Field of Classification Search
CPC ................. H01M 4/505; H01M 4/525; H01M 2004/028; H01M 4/485; H01M 4/131; C01G 53/50
See application file for complete search history.

(56) References Cited

U.S. PATENT DOCUMENTS

2010/0273057 A1   10/2010  Watanabe et al.
2014/0011090 A1    1/2014  Toya et al.
(Continued)

FOREIGN PATENT DOCUMENTS

JP    2003-31222 A    1/2003
JP    2010-40383 A    2/2010
(Continued)

OTHER PUBLICATIONS

International Search Report in corresponding PCT Application Serial No. PCT/JP2016/082205, dated Dec. 6, 2016.

*Primary Examiner* — Imran Akram
(74) *Attorney, Agent, or Firm* — Kratz, Quintos & Hanson, LLP

(57) ABSTRACT

An object of the present invention is to provide a positive electrode material for a nonaqueous electrolyte secondary battery, which is capable of inhibiting the gelation of a positive electrode composite material paste without decreasing the charge and discharge capacity and the output characteristics, when used as a positive electrode material for batteries. The positive electrode active material for a nonaqueous electrolyte secondary battery comprises a mixture containing a lithium metal composite oxide represented by (Continued)

a general formula $Li_aNi_{1-x-y-z}Co_xMn_yM_zO_2$ (wherein, $0.03 \leq x \leq 0.35$, $0 \leq y \leq 0.35$, $0 \leq z \leq 0.05$, $0.97 \leq a \leq 1.30$, and M is at least one type of element selected from V, Fe, Cu, Mg, Mo, Nb, Ti, Zr, W and Al) and an ammonium tungstate powder, wherein when 5 g of the positive electrode material is mixed with 100 ml of pure water, the mixture is stirred for 10 minutes and then left to stand for 30 minutes, and then the pH of a supernatant fluid at 25° C. was measured, the pH ranges from 11.2 to 11.8.

22 Claims, 1 Drawing Sheet

(51) Int. Cl.

| | | |
|---|---|---|
| *C01G 41/02* | (2006.01) | |
| *C01G 53/04* | (2006.01) | |
| *H01M 4/1391* | (2010.01) | |
| *H01M 4/505* | (2010.01) | |
| *H01M 4/525* | (2010.01) | |
| *H01M 4/62* | (2006.01) | |
| *C01G 41/00* | (2006.01) | |
| *H01M 10/052* | (2010.01) | |
| *H01M 4/36* | (2006.01) | |
| *C01G 53/00* | (2006.01) | |
| *H01M 4/131* | (2010.01) | |

(52) U.S. Cl.
CPC ............ *C01G 53/04* (2013.01); *C01G 53/50* (2013.01); *H01M 4/1391* (2013.01); *H01M 4/364* (2013.01); *H01M 4/525* (2013.01); *H01M 4/62* (2013.01); *H01M 10/052* (2013.01); *H01M 10/0525* (2013.01); *H01M 4/131* (2013.01); *H01M 10/0431* (2013.01)

(56) References Cited

U.S. PATENT DOCUMENTS

| | | | |
|---|---|---|---|
| 2014/0106228 A1* | 4/2014 | Toya | C01G 53/006 |
| | | | 429/223 |
| 2015/0228974 A1* | 8/2015 | Kokado | C01G 53/42 |
| | | | 429/223 |
| 2015/0364761 A1 | 12/2015 | Fukui et al. | |
| 2016/0093885 A1 | 3/2016 | Kamata et al. | |

FOREIGN PATENT DOCUMENTS

| | | |
|---|---|---|
| JP | 2010-257624 A | 11/2010 |
| JP | 2012-28313 A | 2/2012 |
| JP | 2013-73779 A | 3/2013 |
| JP | 2013-152866 A | 8/2013 |
| JP | 2014-53168 A | 3/2014 |
| WO | 2012131881 A1 | 10/2012 |
| WO | 2012169274 A1 | 12/2012 |
| WO | 2014181891 A1 | 11/2014 |

* cited by examiner

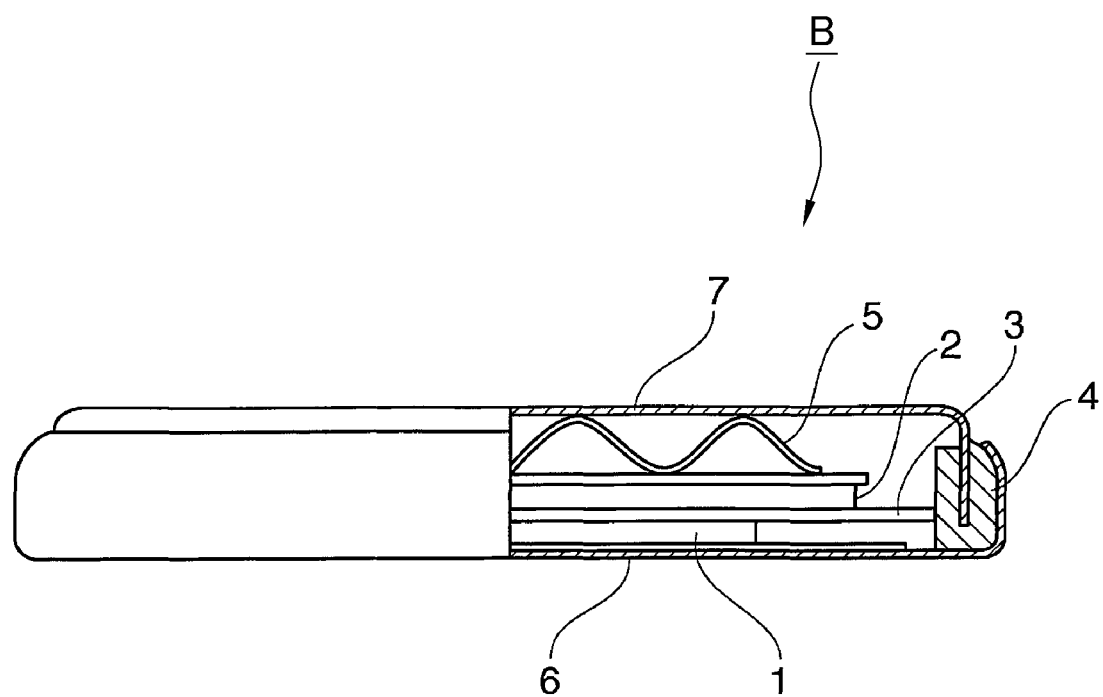

POSITIVE ELECTRODE MATERIAL FOR NONAQUEOUS ELECTROLYTE SECONDARY BATTERY AND METHOD FOR PRODUCING THE SAME, AND POSITIVE ELECTRODE COMPOSITE MATERIAL PASTE, AND NONAQUEOUS ELECTROLYTE SECONDARY BATTERY

TECHNICAL FIELD

The present invention relates to a positive electrode material for a nonaqueous electrolyte secondary battery and a method for producing the same, and a positive electrode composite material paste, and a nonaqueous electrolyte secondary battery.

BACKGROUND ART

In recent years, the development of compact and lightweight nonaqueous electrolyte secondary batteries having high density is strongly desired, as the spread of portable electronic equipment such as cellular phones and notebook personal computers. Moreover, the development of high-output secondary batteries as batteries for electric vehicles including hybrid vehicles is strongly desired.

An example of a nonaqueous electrolyte secondary battery satisfying such requirements is a lithium ion secondary battery. The lithium ion secondary battery is composed of a negative electrode, a positive electrode, and an electrolytic solution, for example, wherein a negative electrode active material and a positive electrode active material capable of eliminating and inserting lithium are used.

Such lithium ion secondary batteries are currently actively studied and developed. Of these batteries, lithium ion secondary batteries in which a layered or spinel-type lithium-metal composite oxide is used for a positive electrode active material is capable of producing voltage as high as 4V, and thus is under commercialization as batteries having high energy density.

Examples of positive electrode active materials that have been mainly proposed to date include a lithium-cobalt composite dioxide ($LiCoO_2$) that can be relatively easily synthesized, a lithium-nickel composite dioxide ($LiNiO_2$) containing nickel that is less expensive than cobalt, a lithium nickel cobalt manganese composite dioxide ($LiNi_{1/3}Co_{1/3}Mn_{1/3}O_2$), and a lithium manganese composite tetraoxide ($LiMn_2O_4$) containing manganese.

Of these examples, a lithium-nickel composite dioxide and a lithium-nickel cobalt manganese composite dioxide are attracting attention as materials having good cycle characteristics and exhibiting low resistance and high output. Achieving low resistance required for increased output has been considered seriously in recent years.

When a battery is prepared using the above positive electrode active material, the positive electrode active material is dissolved together with a binder (poly(vinylidene fluoride): PVDF) and carbon (acetylene black) as a conductive aid using an organic solvent such as N-methyl-2-pyrrolidone (NMP) to give a positive electrode composite material paste, and then the paste is applied to a charge collector such as an Al foil, thereby preparing a positive electrode.

However, lithium in the positive electrode active material reacts with water contained in an atmosphere to form a lithium hydroxide, and then the lithium hydroxide acts on the binder in a composition containing a positive electrode mixture, which increases the viscosity of the composition and causes gelation. This has frequently made stable application to a charge collector difficult. Here, the term "gelation of positive electrode composite material paste" refers to a state in which increased viscosity results in the loss of flowability and homogeneity. When gelation proceeds extremely, application to a charge collector becomes impossible. Also, mild gelation significantly affects the value of resistance of the thus prepared electrode sheet, lowering battery properties such as the discharge capacity, and the rate characteristics of a battery produced using the thus produced electrode sheet.

Regarding the above gelation, Patent Literature 1 discloses that when a positive electrode active material is slurried with pure water, stirred, and left to stand, and then only a positive electrode active material, the supernatant of which has a pH of 12.0 or higher and 12.7 or lower at 25° C., is selected, the thus obtained positive electrode active material causes no gelation upon preparation of batteries. However, such a specified pH is still high, and the resulting effect of preventing gelation is insufficient because of reasons described below. In Patent Literature 1, pH is adjusted by eliminating Li from the positive electrode active materials, so that the pH can only be adjusted within a range that causes no decrease in other battery performances, and the pH cannot be optimized for preventing gelation.

Moreover, Patent Literature 2 discloses that gelation upon preparation of batteries is inhibited by introducing carbon dioxide gas in a step of storing and a step of mixing a positive electrode active material, a conductive aid, a binder and an organic solvent. However, gelation is often caused by a positive electrode active material, and thus the effect is limited even if carbon dioxide gas is introduced. Furthermore, lithium carbonate that is generated on the surface of a positive electrode active material as a result of introduction of carbon dioxide gas causes a decrease in battery performance.

Patent Literature 3 discloses a positive electrode composition for a nonaqueous electrolytic solution secondary battery, which contains a positive electrode active material comprising a lithium-transition-metal composite oxide and additional particles comprising acidic oxide particles, and states that a slurry for a positive electrode does not undergo gelation upon production of a positive electrode, the operability is enhanced and the yield is improved. However, the effect of inhibiting gelation in Patent Literature 3 is not sufficient.

Patent Literature 4 discloses that in order to prevent battery swelling due to gas generation, a positive electrode active material is produced by adhering ammonium tungstate or the like to composite oxide particles and then performing heat treatment. Furthermore, Patent Literature 5 discloses a method for producing a positive electrode active material by dispersing a tungsten oxide such as ammonium metatungstate in lithium metal composite oxide powder and then performing heat treatment. However, ammonium tungstate is used therein for preventing gas generation and achieving the high capacity and the high output of the positive electrode active material, and these literatures do not particularly disclose about the gelation of the positive electrode composite material slurries.

CITATION LIST

Patent Literature

[Patent Literature 1] Japanese Patent Laid-Open Publication No. 2003-31222
[Patent Literature 2] Japanese Patent Laid-Open Publication No. 2013-73779

[Patent Literature 3] Japanese Patent Laid-Open Publication No. 2012-28313
[Patent Literature 4] Japanese Patent Laid-Open Publication No. 2010-40383
[Patent Literature5] Japanese Patent Laid-Open Publication No. 2013-152866

SUMMARY OF INVENTION

Technical Problem

In view of the above problems, an object of the present invention is to provide: a positive electrode material for a nonaqueous electrolyte secondary battery capable of inhibiting the gelation of a positive electrode composite material paste without decreasing the charge and discharge capacity and the output characteristics when used for a positive electrode, and a method for producing the same; and the positive electrode composite material paste, for which the positive electrode material is used, and a nonaqueous electrolyte secondary battery.

Solution to Problem

The present inventor has intensively studied the effects on the gelation of a positive electrode composite material paste in order to achieve the above object. As a result, the present inventor has obtained a finding that the gelation of a positive electrode composite material paste is strongly affected by the pH of a positive electrode material containing a positive electrode active material, and that through mixing of a positive electrode material with ammonium tungstate, the pH of the positive electrode material is optimized while suppressing a decrease in battery properties, so that the gelation of the positive electrode composite material paste can be inhibited. Thus, the present inventor has completed the present invention.

The positive electrode material for a nonaqueous electrolyte secondary battery of a $1^{st}$ invention is a positive electrode material for a nonaqueous electrolyte secondary battery, which comprises a mixture containing a lithium metal composite oxide represented by a general formula $Li_aNi_{1-x-y-z}Co_xMn_yM_zO_2$ (wherein $0.03 \leq x \leq 0.35$, $0 \leq y \leq 0.35$, $0 \leq z \leq 0.05$, $0.97 \leq a \leq 1.30$, and M is at least one type of element selected from V, Fe, Cu, Mg, Mo, Nb, Ti, Zr, W and Al), and an ammonium tungstate powder, wherein when 5 g of the positive electrode material is mixed with 100 ml of pure water, the mixture is stirred for 10 minutes and then left to stand for 30 minutes, and the pH of a supernatant fluid at 25° C. is measured, the pH ranges from 11.2 to 11.8.

The positive electrode material for a nonaqueous electrolyte secondary battery of a $2^{nd}$ invention is the positive electrode material in the $1^4$ invention wherein the mixture further contains lithium tungstate.

The positive electrode material for a nonaqueous electrolyte secondary battery of a $3^{rd}$ invention is the positive electrode material in the $2^{nd}$ invention, wherein the amount of lithium contained in lithium compounds other than the above lithium tungstate present on the surface of the lithium metal composite oxide and, is 0.1 mass % or less with respect to the lithium metal composite oxide.

The positive electrode material for a nonaqueous electrolyte secondary battery of a $4^{th}$ invention is the positive electrode material in the $2^{nd}$ invention or the $3^{rd}$ invention, wherein the lithium tungstate is present on the surface of the lithium metal composite oxide.

The positive electrode material for a nonaqueous electrolyte secondary battery of a $5^{th}$ invention is the positive electrode material in any one of the $2^{nd}$ invention to the $4^{th}$ invention, wherein the lithium tungstate is present in the form of $Li_2WO_4$, $Li_4WO_5$, $Li_6W)_6$, $Li_2W_4O_{13}$, $Li_2W_2O_7$, $Li_6W_2O_9$, $Li_2W_2O_7$, $Li_2W_5O_{16}$, $Li_9W_{19}O_{55}$, $Li_3W_{10}O_{30}$, $Li_{18}W_5O_{15}$, or a hydrate thereof.

The positive electrode material for a nonaqueous electrolyte secondary battery of a $6^{th}$ invention is the positive electrode material in any one of the $1^{st}$ invention to the $5^{th}$ invention, wherein the atomic ratio of tungsten contained in the ammonium tungstate powder ranges from 0.05 to 0.4 percent with respect to the total number of Ni, Co, Mn and M atoms contained in the lithium metal composite oxide.

The positive electrode material for a nonaqueous electrolyte secondary battery of a $7^{th}$ invention is the positive electrode material in any one of the $2^{nd}$ invention to the $5^{th}$ invention, wherein the atomic ratio of tungsten contained in the ammonium tungstate powder and the lithium tungstate ranges from 0.05 to 0.4 percent with respect to the total number of Ni, Co, Mn and M atoms contained in the lithium metal composite oxide.

A positive electrode composite material paste of an $8^{th}$ invention contains the positive electrode material for a nonaqueous electrolyte secondary battery of any one of the $1^{st}$ invention to the $7^{th}$ invention.

A nonaqueous electrolyte secondary battery of a $9^{th}$ invention has a positive electrode containing the positive electrode material for a nonaqueous electrolyte secondary battery of any one of the $1^{st}$ invention to the $7^{th}$ invention.

A method for producing a positive electrode material for a nonaqueous electrolyte secondary battery of a $10^{th}$ invention comprises a step of mixing: a lithium metal composite oxide comprising primary particles represented by a general formula $Li_aNi_{1-x-y-z}Co_xMn_yM_zO_2$ (wherein, $0.03 \leq x \leq 0.35$, $0 \leq y \leq 0.35$, $0 \leq z \leq 0.05$, $0.97 \leq a \leq 1.30$, and M is at least one type of element selected from V, Fe, Cu, Mg, Mo, Nb, Ti, Zr, W and Al) and secondary particles formed by aggregation of the primary particles; and an ammonium tungstate powder, wherein the above ammonium tungstate powder is mixed such that when 5 g of the above positive electrode material is mixed with 100 ml of pure water, the mixture is stirred for 10 minutes and then left to stand for 30 minutes, and then the pH of the supernatant fluid at 25° C. is measured, the pH ranges from 11.2 to 11.8.

Advantageous Effects of Invention

According to the $1^{st}$ invention, the positive electrode material comprises a mixture containing the lithium metal composite oxide and the ammonium tungstate, wherein when 5 g of the above positive electrode material is mixed with 100 ml of pure water, the mixture is stirred for 10 minutes and then left to stand for 30 minutes, and then the pH of the supernatant fluid at 25° C. is measured, the pH ranges from 11.2 to 11.8. The pH of the supernatant fluid obtained from the mixture is specified, so that the amount of excessive lithium of the positive electrode material can be easily specified, and the alkalinity of the positive electrode composite material paste can be easily lowered. Therefore, the use of this positive electrode material as a positive electrode material for batteries enables to prevent the gelation of the positive electrode composite material paste while maintaining the charge and discharge capacity and high-output characteristics of the secondary battery.

According to the $2^{nd}$ invention, the mixture further contains lithium tungstate, so that the reaction of excessive lithium and the like proceeds to lithium tungstate to lower the pH of the positive electrode composite material paste, and thus the gelation thereof can be prevented more appropriately.

According to the 3$^{rd}$ invention, the amount of lithium contained in lithium compounds other than the above lithium tungstate, which are present on the surface of the lithium metal composite oxide, is 0.1 mass % or less with respect to the above lithium metal composite oxide, so that the amount of unreacted lithium compounds having poor lithium conductivity and inhibiting the intercalation of lithium ions from lithium metal composite oxides can be decreased, and the output characteristics and the battery capacity can be improved.

According to the 4$^{th}$ invention, the lithium tungstate is present on the surface of the lithium metal composite oxide, so that Li conduction paths are formed at the boundaries with an electrolytic solution, the reaction resistance of the lithium metal composite oxide is lowered, and the output characteristics can further be improved.

According to the 5$^{th}$ invention, the lithium tungstate is present in the form of $Li_2WO_4$, $Li_4WO_5$, $Li_6WO_6$, $Li_2W_4O_{13}$, $Li_2W_2O_7$, $Li_6W_2O_9$, $Li_2W_2O_7$, $Li_2W_5O_{16}$, $Li_9W_{19}O_{55}$, $Li_3W_{10})_{30}$, $Li_{18}W_5O_{15}$, or a hydrate thereof, so that lithium ion conductivity is increased, and the reaction resistance of the active material can be sufficiently lowered while maintaining the high capacity of the battery.

According to the 6$^{th}$ invention, the atomic ratio of tungsten contained in the ammonium tungstate powder ranges from 0.05 to 0.4 percent with respect to the total number of Ni, Co, Mn and M atoms contained in the lithium metal composite oxide, so that the lithium tungstate can be formed and the output characteristics and the battery capacity can further be improved while controlling the pH within the above range.

According to the 7$^{th}$ invention, the atomic ratio of tungsten contained in the ammonium tungstate powder and the lithium tungstate ranges from 0.05 to 0.4 percent with respect to the total number of Ni, Co, Mn and M atoms contained in the lithium metal composite oxide, so that lithium tungstate is formed and the output characteristics and the battery capacity can further be improved while controlling the pH within the above range.

According to the 8$^{th}$ invention, the positive electrode composite material paste contains the positive electrode material for a nonaqueous electrolyte secondary battery of any one of the 1$^{st}$ invention to the 7$^{th}$ invention, so that high capacity and high output can be achieved for a battery produced using the positive electrode composite material paste, as well as the alkalinity of the positive electrode composite material paste is decreased and the gelation of the positive electrode composite material paste can be prevented.

According to the 9$^{th}$ invention, the nonaqueous electrolyte secondary battery has the positive electrode containing the positive electrode material for a nonaqueous electrolyte secondary battery of any one of the 1$^{st}$ invention to the 7$^{th}$ invention, so that the battery can have high capacity, high output, and improved yield.

According to the 10$^{th}$ invention, the method for producing the positive electrode material for a nonaqueous electrolyte secondary battery comprises a step of mixing a lithium metal composite oxide represented by a general formula $Li_aNi_{1-x-y-z}Co_xMn_yM_zO_2$ (wherein, $0.03 \leq x \leq 0.35$, $0 \leq y \leq 0.35$, $0 \leq z \leq 0.05$, $0.97 \leq a \leq 1.30$, and M is at least one element selected from V, Fe, Cu, Mg, Mo, Nb, Ti, Zr, W and Al) with an ammonium tungstate powder, wherein in the step, the ammonium tungstate powder is mixed such that when 5 g of the positive electrode material is mixed with 100 ml of pure water, the mixture is stirred for 10 minutes and then left to stand for 30 minutes, and then the pH of the supernatant fluid at 25° C. is measured, the pH ranges from 11.2 to 11.8. The pH of the supernatant fluid is specified, so that the amount of excessive lithium of the positive electrode material can be easily specified, and the alkalinity of the positive electrode composite material paste can be readily decreased. Therefore, the use of the thus obtained positive electrode material as a positive electrode material for a battery enables to prevent the gelation of the positive electrode composite material paste while maintaining the charge and discharge capacity and the high-output characteristics of the secondary battery.

BRIEF DESCRIPTION OF DRAWINGS

FIG. 1 is a schematic side view showing a coin type battery used for evaluation of batteries.

DESCRIPTION OF EMBODIMENTS

Hereafter, the positive electrode material for a nonaqueous electrolyte secondary battery according to the present invention and the production method therefor will be described and then, a positive electrode composite material paste and a nonaqueous electrolyte secondary battery in which the positive electrode material is used will be described.

(1) Positive Electrode Material for a Nonaqueous Electrolyte Secondary Battery

The positive electrode material for a nonaqueous electrolyte secondary battery of the present invention is a positive electrode material for a nonaqueous electrolyte secondary battery comprising a mixture that contains a lithium metal composite oxide represented by a general formula $Li_aNi_{1-x-y-z}Co_xMn_yM_zO_2$ (wherein $0.03 \leq x \leq 0.35$, $0 \leq y \leq 0.35$, $0 \leq z \leq 0.05$, $0.97 \leq a \leq 1.30$, and M is at least one type of element selected from V, Fe, Cu, Mg, Mo, Nb, Ti, Zr, W and Al) and an ammonium tungstate powder, wherein when 5 g of the above positive electrode material is mixed with 100 ml of pure water, the mixture is stirred for 10 minutes and then left to stand for 30 minutes, and then the pH of the supernatant fluid at 25° C. is measured, the pH ranges from 11.2 to 11.8. The resultant is used as a positive electrode for a battery, so that the gelation of the positive electrode composite material paste can be prevented while maintaining the charge and discharge capacity, and the high-output characteristics of the secondary battery.

For the positive electrode active material, in order to increase the area of contact with an electrolytic solution and thus to improve the charge and discharge capacity and the output characteristics of a nonaqueous electrolyte secondary battery (hereafter, may simply referred to as "battery"), a lithium metal composite oxide comprising primary particles and secondary particles formed through aggregation of the primary particles is used. However, unreacted lithium compounds are present on the surface of the primary particles and the secondary particles. Particularly, a lithium metal composite oxide obtained through firing of a metal composite hydroxide and lithium compounds or a lithium metal composite oxide obtained through firing of the metal composite oxide and lithium compounds tends to increase the amount of unreacted lithium compounds. In a positive electrode composite material paste (hereafter, may simply be referral to as "paste") in which such a positive electrode active material is used, lithium eluted from unreacted lithium compounds or the crystal of the lithium metal composite oxide increase the pH of the paste, a binder contained in the paste is altered, and thus the gelation of the paste proceeds. For example, in the case of a paste containing polyvinylidene fluoride (PVDF) as a binder, hydrogen fluoride (HF) is eliminated from PVDF to form a double bond, and then a crosslinking reaction proceeds from the double bond, so that a gelation phenomenon takes place.

Therefore, the gelation of the paste can be inhibited by suppressing the increase of the pH of the paste and controlling the pH within a proper range. However, since the amount of lithium eluted from the lithium metal composite oxide is reduced to suppress the increase of the pH of the paste, attempts to remove unreacted lithium compounds from the lithium metal composite oxide and to reduce the amount of lithium in the crystal of the lithium metal composite oxide result in an excessive amount of lithium to be removed from the lithium metal composite oxide in order to inhibit the gelation, and result in decreases in charge and discharge capacity (hereinafter, may also be referral to as "battery capacity") and output characteristics upon application thereof to a battery.

It is important for the positive electrode material for a nonaqueous electrolyte secondary battery (hereinafter, may simply be referred to as "positive electrode material") of the present invention to mix with an ammonium tungstate powder. The gelation of paste can be prevented by suppressing the increase of the pH due to lithium eluted from the lithium metal composite oxide. Hence, there is an option to add acid or a substance exhibiting acidity such as acid or acidic oxide for neutralization. However, when acid is added, the lithium metal composite oxide is damaged by the acid, lowering battery properties. Moreover, acidic oxide has a weak effect of suppressing pH and an excessive amount thereof is added to sufficiently inhibit gelation, lowering battery properties.

On the other hand, ammonium tungstate does not damage the lithium metal composite oxide and has a high effect of suppressing pH. Accordingly, the gelation of a paste can be prevented without lowering battery capacity and output characteristics. Although specific reasons for this are unknown, however, ammonium tungstate has high reactivity with lithium, and is considered to rapidly react with lithium eluted from the lithium metal composite oxide in the paste, so as to generate lithium tungstate, to suppress the increase of the pH, and to prevent gelation.

Ammonium tungstate is not particularly limited, and, for example, para-ammonium tungstate, or ammonium metatungstate is appropriately used.

In the above positive electrode material, the above pH of a supernatant fluid is controlled within the above range. The above pH of a supernatant fluid is strongly associated with the pH of a paste, and thus the increase in the pH of the paste obtained using the positive electrode material is suppressed, and gelation can be prevented. Particularly, a lithium metal composite oxide having a specific surface area increased to improve the output characteristics results in an increased amount of lithium eluted, but can prevent gelation for a long time period, and thus is effective.

If the above pH is higher than 11.8, the increase of the pH in the paste cannot be suppressed and the prevention of gelation is difficult. On the other hand, the pH that is less than 11.2 leads to a state where lithium is removed excessively from a lithium metal composite oxide, lowering the battery capacity and the output characteristics.

As described above, ammonium tungstate has high reactivity with lithium, and a reaction with unreacted lithium compounds that are present on the surface of a lithium metal composite oxide and excessive lithium in the lithium metal composite oxide easily proceeds, so that lithium tungstate can be formed.

Meanwhile, a lithium metal composite oxide is, in order to increase the contact area with an electrolytic solution and to be prepared to have an appropriate particle size so as to enhance the packing property within a positive electrode, preferably composed of isolated primary particles and secondary particles (hereinafter, they may also be referred to as "lithium metal composite oxide particles") formed through aggregation of the primary particles. In the case of such lithium metal composite oxide particles, while unreacted lithium compounds are also present on the surface of the primary particles within the secondary particles, most unreacted lithium compounds are present on the surface of the lithium metal composite oxide particles. The positive electrode material of the present invention makes it possible to remove the above unreacted lithium compounds by reacting them with ammonium tungstate, wherein particularly, unreacted lithium compounds existing on the surface of lithium metal composite oxide particles are removed, so that the output characteristics and the battery capacity are effectively improved.

Therefore, most lithium tungstate formed by the reaction with unreacted lithium compounds or excessive lithium is present on the surface of a lithium metal composite oxide in the form of fine particles or thin films Lithium tungstate has high lithium ion conductivity and has an effect of accelerating the intercalation of lithium ions. Accordingly, the presence of lithium tungstate within a positive electrode is effective. Moreover, lithium tungstate is formed on the surface of a lithium metal composite oxide in the form of fine particles or thin films, and Li conduction paths are formed at the boundaries with an electrolytic solution, so that the reaction resistance of the lithium metal composite oxide can be reduced and the output characteristics can be further improved.

Specifically, a reduction in the reaction resistance reduces voltage loss within a battery and voltage to be actually applied to the load side becomes relatively high, so that high output can be obtained. Moreover, increased voltage is applied to the load side, so that lithium insertion and de-insertion are sufficiently performed at the lithium metal composite oxide and the battery capacity is also improved.

Moreover, lithium in unreacted lithium compounds and excessive lithium in a lithium metal composite oxide are fixed as lithium tungstate in advance, the elution of lithium into a paste can be reduced and the gelation of the paste can be efficiently prevented.

Therefore, the positive electrode material preferably contains lithium tungstate. Moreover, the above lithium tungstate is preferably present on the surface of the above lithium metal composite oxide. Accordingly, the output characteristics and the battery capacity can be improved.

The thus formed lithium tungstate is preferably present in the form of $Li_2WO_4$, $Li_4WO_5$, $Li_6WO_6$, $Li_2W_4O_{13}$, $Li_2W_2O_7$, $Li_6W_2O_9$, $Li_2W_2O_7$, $Li_2W_5O_{16}$, $Li_9W_{19}O_{55}$, $Li_3W_{19}O_{30}$, $L_{19}W_5O_{15}$, or a hydrate thereof, and is more preferably present in the form of $Li_2WO_4$ or $Li_4WO_5$ having high lithium ion conductivity, or a hydrate thereof.

The amount of tungsten to be contained in ammonium tungstate powder mixed with the positive electrode material may be an amount with which the pH can be controlled to range from 11.2 to 11.8, or the amount of tungsten to be contained in both ammonium tungstate powder and lithium tungstate formed through reaction of the above ammonium tungstate powder with lithium may be an amount with which the pH can be controlled to range from 11.2 to 11.8. The atomic ratio of such tungsten preferably ranges from 0.05 to 0.4 percent, with respect to the total number of Ni, Co, Mn and M atoms contained in the above lithium metal composite oxide. Accordingly, while controlling the pH within the above range, lithium tungstate is formed and the output characteristics and the battery capacity can further be improved. The atomic ratio of tungsten that is less than 0.05 percent may result in an insufficient effect of improving output characteristics and battery capacity. The atomic ratio of tungsten that is higher than 0.4 percent results in an excessive amount of lithium tungstate formed, so that lithium conduction between the lithium metal composite oxide and an electrolytic solution is inhibited, and lithium tungstate's effect of accelerating the intercalation of lithium ions may not be exhibited.

Furthermore, the amount of lithium (hereinafter, may also be referred to as "excessive lithium") contained in lithium compounds other than lithium tungstate, which are present on the surface of the above lithium metal composite oxide, is preferably 0.1 mass % or less with respect to the amount of the lithium metal composite oxide. Such unreacted lithium compounds have poor lithium conductivity, and inhibit the intercalation of lithium ions from the lithium metal composite oxide. The amount of excessive lithium indicates the amount of the above existing unreacted lithium compounds, and controlling the amount of excessive lithium to be 0.1 mass % or less enables improvement in output characteristics and battery capacity. Particularly, excessive lithium is reacted with ammonium tungstate, so that the amount of the excessive lithium can be reduced more effectively.

The more reduced amount of excessive lithium, the more improved battery properties. When the amount of excessive lithium is reduced by reaction with ammonium tungstate, the lower limit thereof is about 0.01 mass %.

The positive electrode material of the present invention is intended to limit the pH within a proper range by mixing a lithium metal composite oxide with ammonium tungstate, as described above. Therefore, the lithium metal composite oxide is not particularly limited, as long as it has a composition represented by the above general formula. However, in view of high battery capacity and output characteristics, a lithium metal composite oxide that has a high specific surface area, and the thus increased contact area with an electrolytic solution when used for a battery is preferably used. An example of such a lithium metal composite oxide having a high specific surface area is a lithium metal composite oxide that has a hollow structure or a porous particle structure and is preferably used herein. Furthermore, in order to improve cycle characteristics, a lithium metal composite oxide having a uniform particle size is preferably used. For example, when particle sizes, by which the accumulated volume accounts for 10% and 90% of the total volume of all particles, are represented by D10 and D90, respectively, a lithium metal composite oxide having an index [(D90−D10)/mean particle diameter] indicating the expansion of the particle size distribution of 0.6 or less is preferably used.

(2) Method for Producing the Positive Electrode Material for a Nonaqueous Electrolyte Secondary Battery The method for producing the positive electrode material for a nonaqueous electrolyte secondary battery of the present invention is a method for producing the positive electrode material for a nonaqueous electrolyte secondary battery comprising a step of mixing a lithium metal composite oxide that comprises primary particles represented by a general formula $Li_aNi_{1-x-y-z}Co_xMn_yM_zO_2$ (wherein $0.03 \leq x \leq 0.35$, $0 \leq y \leq 0.35$, $0 \leq z \leq 0.05$, $0.97 \leq a \leq 1.30$, and M is at least one type of element selected from V, Fe, Cu, Mg, Mo, Nb, Ti, Zr, W and Al) and secondary particles formed through aggregation of the primary particles, with an ammonium tungstate powder, wherein in the step, the above ammonium tungstate is mixed such that when 5 g of the above positive electrode material is mixed with 100 ml of pure water, the mixture is stirred for 10 minutes and then left to stand for 30 minutes, and then the pH of the supernatant fluid at 25° C. is measured, the pH ranges from 11.2 to 11.8. Hereafter, the method for producing the positive electrode material for a nonaqueous electrolyte secondary battery of the present invention (hereafter, may also be simply referred to as "production method".) will be described.

(2.1) Lithium Metal Composite Oxide Production Step

In the production method according to the present invention, the lithium metal composite oxide is not particularly limited as described above, a lithium metal composite oxide that is produced by a known method can be used. Furthermore, in a preferred aspect, a lithium metal composite oxide having a hollow structure or a porous particle structure, or a lithium metal composite oxide having a uniform particle size is used. As a method for producing such a lithium metal composite oxide, methods disclosed in, for example, International Publications WO2012/131881, WO2012/169274, and WO2014/181891 (hereinafter, they are collectively referral to as "International Publications") can be used. Such a method for producing the lithium metal composite oxide is not particularly limited and can comprise: for example, a crystallization step (the following 2.1.1) of obtaining a metal composite hydroxide represented by a general formula: $Ni_{1-x-y-z}Co_xMn_yM_z(OH)_{2+\alpha}$ (wherein $0.03 \leq x \leq 0.35$, $0 \leq y \leq 0.35$, $0 \leq z \leq 0.05$, $0.97 \leq a \leq 1.30$, $0 \leq \alpha \leq 0.5$, and M is at least one type of element selected from V, Fe, Cu, Mg, Mo, Nb, Ti, Zr, W and Al); a lithium mixing step (the following 2.1.2) of obtaining a lithium mixture by mixing the metal composite hydroxide with lithium compounds such that the ratio of the number of lithium atoms to the total number of the atoms of metallic elements other than lithium ranges from 0.97 to 1.30; and a firing step (the following 2.1.3) of obtaining a lithium metal composite oxide by firing the thus obtained lithium mixture in an oxidizing atmosphere while maintaining it at a firing temperature between 600° C. and 1000° C. for 1 to 24 hours. Each of steps illustrated herein is described as follows.

(2.1.1) Crystallization Step

In general, when a metal composite hydroxide (hereafter, may also be simply referral to as "composite hydroxide") is industrially prepared by a crystallization method, a continuous crystallization method is often employed. This is a method by which composite hydroxides having the same composition can be prepared in large amounts conveniently. Composite hydroxide that is obtained by a general crystallization method is composed of secondary particles formed through aggregation of primary particles and a small amount of isolated primary particles, and a lithium metal composite oxide obtained using the composite hydroxide has a similar configuration of particles. However, the continuous crystallization method is problematic in that the particle size distribution of the obtained product tends to be a relatively wide normal distribution, and particles having a uniform particle size cannot always be obtained. If a battery is assembled using as a positive electrode active material a lithium metal composite oxide obtained using such composite hydroxide having a relatively wide particle size distribution as a raw material, mixing-in of fine powder can take place, which often deteriorate the cycle characteristics. In addition, if the particle size is not uniform, the reaction resistance increases, and thus the battery output can be adversely affected.

Therefore, although in the crystallization step, a general continuous crystallization method can be used as a method for obtaining nickel cobalt manganese composite hydroxide particles, for example, as disclosed in International Publications, a nucleation stage (the following 2.1.1.1) and a particle growth stage (the following 2.1.1.2) are performed clearly separately to achieve a uniform particle size, and then a composite hydroxide having a narrow particle size distribution is preferably obtained. However, the method is not limited thereto. Such a crystallization method comprising the nucleation stage and the particle growth stage separately is as described below (2.1.1.1) Nucleation Step First, a nickel salt, a cobalt salt, a manganese salt and an additional element M salt that are easily soluble in water are dissolved in water at a predetermined ratio, so that an aqueous mixture containing nickel, cobalt, manganese and additional element M is prepared. Regarding a nickel salt, a cobalt salt, and a manganese salt, sulfate is preferably used. The aqueous mixture and an aqueous solution containing an ammonium ion donor, such as ammonia water, are supplied into a crystallization reactor while stirring the solution to form a reaction solution within the reactor, and at the same time, an aqueous alkaline solution such as an aqueous sodium hydroxide solution is supplied, thereby controlling the pH of the reaction solution at a constant pH. In addition, when precipitation takes place as a result of adding the aqueous solution of the additional element, M salt, to the aqueous mixture, the aqueous solution is supplied simultaneously with but separately from the aqueous mixture. Here, through regulation of the amount of the aqueous alkaline solution in such a manner that the pH is at a constant level, fine nuclei of the above metal hydroxide can be selectively generated within the reactor.

Here, the pH of the reaction solution is regulated to be 12.0 or higher, and to range from preferably 12.0 to 14.0 based on the pH of the solution at 25° C. Hence, fine nuclei of a metal hydroxide can be selectively generated in the reaction solution. The pH that is less than 12.0 causes nuclear growth to take place simultaneously and tends to result in a wide particle size distribution, and tends to result in a bulky, large particle size because of the insufficient total number of nuclei. The total number of nuclei can be controlled by pH, ammonia concentration, and the amount of an aqueous mixture to be supplied in the nucleation step.

Moreover, the ammonia concentration in a reaction solution is preferably maintained at a constant level ranging from 8 g/L to 15 g/L. The solubility of metal ions cannot be maintained at a constant level, unless the ammonia concentration is at least at a certain level. Uniform hydroxide particles cannot be formed, and gel nuclei are easily formed, which tend to result in a wide particle size distribution. However, the ammonia concentration of 15 g/L or more results in dense formation of hydroxide, a dense structure of the finally obtained positive electrode active material for a nonaqueous electrolyte secondary battery, and a decrease in specific surface area, and thus is not preferred.

Moreover, the reaction solution is preferably set at temperatures ranging from 35° C. to 60° C. At the temperature of less than 35° C., the solubility of metal ions to be supplied cannot be sufficiently obtained because of such a low temperature, nuclei are easily generated, and the generation of nuclei won't be easily controlled. In addition, the temperature exceeding 60° C. leads to an insufficient amount of ammonia for complexation due to accelerated ammonia volatilization, and similarly causes the solubility of metal ions to be decreased. The pH and the time for crystallization in the nucleation step can be arbitrarily set depending on the mean particle size of composite hydroxide particles of interest (2.1.1.2) Particle Growth Step In the particle growth step, a reaction solution is controlled to have a pH ranging from 10.5 to 12.0 based on the pH of the solution at 25° C., which is lower than that in the nucleation step. Through the control of the pH within the range after nucleation, only the growth of nuclei generated in the nucleation step is preferentially caused to take place to suppress new nucleation, so that the uniformity of the particle sizes of composite hydroxide particles can be significantly improved. The pH of higher than 12.0 causes not only particle growth, but also nucleation, making it difficult to significantly improve the particle size uniformity. On the other hand, the pH of less than 10.5 results in increased metal ions remaining in the reaction solution, which decreases the production efficiency. In addition, when sulfate is used as a raw material, a sulfur (S) content remaining in composite hydroxide particles is increased, and this is not preferred. The ammonia concentration and the temperature of the reaction solution may be set within ranges similar to those in the nucleation step.

Some of liquid components in a reaction solution are discharged outside the reactor after nucleation or during the particle growth stage, so as to increase the concentration of the composite hydroxide particles in the reaction solution, and then particle growth can be performed subsequently. In this manner, the particle size distribution of the particles can be narrowed more, and the particle density can also be increased.

Controlling an atmosphere within the reactor in the nucleation step and the particle growth step makes it possible to control the particle structure of a lithium metal composite oxide obtained using a composite hydroxide. Specifically, through the control of an oxygen concentration in an atmosphere, the size of primary particles composing the composite hydroxide can be controlled, and the denseness of composite hydroxide particles can be controlled. Therefore, when the oxygen concentration inside the reactor is decreased to make the inside a non-oxidizing atmosphere, the denseness of particles and the denseness of the obtained lithium metal composite oxide increase, thereby causing the lithium metal composite oxide to have a solid-core structure. On the other hand, when the oxygen concentration inside the reactor is increased to make the inside an oxidizing atmosphere, the denseness of particles decreases. Through changing the atmosphere to non-oxidizing and oxidizing as disclosed in the International Publications, composite hydroxide particles have a composite structure comprising a portion with high denseness and a portion with decreased denseness, and the obtained lithium metal composite oxide has a hollow structure or a porous structure. Particularly, in the nucleation step and early in the particle growth step, the atmosphere inside the reactor is made an oxidizing atmosphere, subsequently, the same is controlled to be a non-oxidizing atmosphere, so that the denseness of the central part of composite hydroxide particles can be decreased and the denseness of the peripheral parts of the same can be increased. A positive electrode active material obtained from such composite hydroxide particles has a hollow structure with a hollow part having a sufficient size. The size of the hollow part can be controlled by adjusting the time length of maintaining an oxidizing atmosphere and the time length of maintaining a non-oxidizing atmosphere.

(2.1.2) Lithium Mixing Step

The lithium mixing step is a step of obtaining a lithium mixture, which comprises mixing the composite hydroxide obtained in the above crystallization step (2.1.1) with lithium compounds such that the ratio (Li/Me) of the number of lithium (Li) atoms to the total number of metallic element atoms (Me) other than lithium ranges from 0.97 to 1.30. When the ratio Li/Me is less than 0.97, the reaction resistance of a positive electrode in a nonaqueous electrolyte secondary battery produced using the thus obtained lithium metal composite oxide as a positive electrode active material increases, and thus the battery output decreases. Also, when the ratio Li/Me is higher than 1.30, the initial discharge capacity of the thus obtained lithium metal composite oxide decreases and the reaction resistance of the positive electrode also increases.

The lithium compounds that can be used herein are not particularly limited, and lithium hydroxide or lithium carbonate, or a mixture thereof can be used appropriately. In view of the ease of handling and the stability of quality, lithium carbonate is more preferably used.

Composite hydroxide particles and lithium compounds are preferably sufficiently mixed in advance. When mixing is performed, a general mixer can be used. For example, a shaker mixer, a Loedige mixer, a Julia Mixer, or a V blender can be used. Specifically, the composite hydroxide particles are mixed sufficiently with lithium compounds to a degree such that the framework is not deformed.

(2.1.3) Firing Step

The firing step is a step of firing the obtained lithium mixture in an oxidizing atmosphere while maintaining it at a firing temperature of 600° C. to 1000° C. for 1 to 24 hours, thereby obtaining lithium metal composite oxide particles serving as a positive electrode active material With the firing temperature of lower than 600° C., a reaction between a composite hydroxide and lithium compounds does not proceed sufficiently, lithium is diffused into the composite hydroxide insufficiently, excessive lithium and unreacted composite hydroxide remain, or a crystal structure is not established in a sufficiently orderly fashion, and thus the output characteristics and the battery capacity decrease. With the firing temperature of higher than 1000° C., sintering takes place actively among lithium metal composite oxide particles to cause abnormal particle growth, the resulting particles are oversized particles, and the output characteristics and the battery capacity decrease.

The time for maintaining at the firing temperature ranges from 1 to 24 hours, preferably 5 to 20 hours, and more preferably 5 to 10 hours. The time of less than 1 hour results in insufficient generation of the lithium metal composite oxide. Also, the time of longer than 24 hours causes active sintering to take place among lithium metal composite oxide particles, and results in abnormal particle growth leading to oversized particles.

The atmosphere upon firing is an oxidizing atmosphere, which is preferably an atmosphere with an oxygen concentration ranging from 18 to 100 capacity %. Specifically, firing is preferably performed in an air current to an oxygen air current. In view of cost, firing is particularly preferably performed in an air current. When the oxygen concentration is less than 18 capacity %, oxidation is insufficient and the crystallinity of the lithium metal composite oxide may be insufficient A furnace to be used for firing is not particularly limited, and may be any furnace with which heating is possible in an air current to an oxygen air current. An electric furnace with no gas generation is preferred and a batch-type or continuous-type furnace is used.

In the above firing conditions, the active sintering and abnormal particle growth of the thus obtained lithium metal composite oxide particles are suppressed, but slight sintering may take place. In such a case, a disintegration step of disintegrating the obtained lithium metal composite oxide particles can further be provided. Disintegration may be performed by a general method to a degree such that the secondary particles of lithium metal composite oxide particles are not disrupted.

Moreover, to reduce excessive lithium of the lithium metal composite oxide, a water washing step may be added after firing. Water washing may be performed under conditions known in the art.

(2.2) Ammonium Tungstate Mixing Step

The ammonium tungstate mixing step is a step of obtaining the positive electrode material for a nonaqueous electrolyte secondary battery according to the present invention; that is, a mixture prepared by mixing the lithium metal composite oxide that is a positive electrode active material obtained in the firing step with ammonium tungstate.

In the mixing step, the amount of ammonium tungstate to be mixed is adjusted such that when 5 g of the obtained positive electrode material is mixed with 100 ml of pure water, the mixture is stirred for 10 minutes and then left to stand for 30 minutes, and then the pH of the supernatant fluid at 25° C. is measured, the pH ranges from 11.2 to 11.8.

Here, depending on the ratio (Li/Me) of the number of Li atoms to the total number of Ni, Co, Mn and M atoms in the fired powder of the lithium metal composite oxide, or the production conditions for the fired powder, the amounts of unreacted lithium compounds and excessive lithium fluctuate, and thus the amount of lithium eluted in a paste varies and the degree of the increase of the pH of the paste also fluctuates. Specifically, the pH of the supernatant fluid associated with the pH of the paste also varies. Therefore, ammonium tungstate is added in an amount that enables to control the pH of the supernatant fluid within the above range.

The amount for addition can be easily determined by sampling a small amount of fired powder in advance to conduct a preliminary test, and then confirming the amount of ammonium tungstate to be added. Moreover, if the production conditions for Li/Me and fired powder remain constant, the pH of the supernatant fluid can be controlled easily within the above range based on the amount for addition determined in the preliminary test.

The amount of ammonium tungstate powder to be mixed may be an amount that enables to control the pH of the supernatant fluid, and is controlled based on the amount of tungsten contained in ammonium tungstate, or the amount of tungsten contained in the above ammonium tungstate and lithium tungstate. Therefore, mixing is preferably performed so that the atomic ratio of tungsten contained in the positive electrode material ranges from 0.05 to 0.4 percent with respect to the total amount of Ni, Co, Mn and M in the fired powder.

Ammonium tungstate may be powdery ammonium tungstate, which is preferably in the form of powder having a fine particle size to a degree such that it is possible to disperse uniformly among lithium metal composite oxide particles and handling is easy and mixing is possible in order to improve the reactivity with unreacted lithium compounds and excessive lithium.

Moreover, ammonium tungstate powder is preferably sufficiently mixed in advance, so that they are uniformly present among lithium metal composite oxide particles. A general mixer can be used for mixing. For example, a shaker mixer, a Loedige mixer, a Julia Mixer, a container blender, a drum blender, or a V blender is used for sufficiently mixing with ammonium tungstate powder to a degree such that the framework of the lithium metal composite oxide particles is not deformed.

Ammonium tungstate has high reactivity with lithium. Hence through mixing thereof in a normal air atmosphere, ammonium tungstate reacts with unreacted lithium compounds contained in the lithium metal composite oxide and excessive lithium, to form lithium tungstate. Specifically, through the mediation of water existing in a normal air atmosphere during mixing, a positive electrode material contains lithium tungstate. Moreover, water is added in advance, in an amount equivalent to that of water existing in an air atmosphere, to the lithium metal composite oxide, so as to be able to cause the reaction of ammonium tungstate. No heat treatment is required in this step.

(3) Positive Electrode Composite Material Paste for Nonaqueous Electrolyte Secondary Battery The positive electrode composite material paste of the present invention enables to reduce the increase of the pH due to the elution of lithium from the lithium metal composite oxide, and to prevent gelation of the paste. Therefore, even during long-term storage, the paste exhibits a small change in viscosity and has high stability. A positive electrode is produced using such a paste, so that the positive electrode stably possesses excellent properties, and the finally obtained battery properties can be stably kept at a high level.

The positive electrode composite material paste is characterized by containing the above positive electrode material, and other constitutive materials equivalent to those for normal positive electrode composite material paste are used. For example, when the total mass of the solid content of a positive electrode composite material from which a solvent has been removed is designated as 100 parts by mass, similarly to a positive electrode of a general nonaqueous electrolyte secondary battery, the content of the positive electrode active material preferably ranges from 60 to 95 parts by mass, the content of a conductive agent preferably ranges from 1 to 20 parts by mass, and the content of a binder preferably ranges from 1 to 20 parts by mass.

Also, as a conductive agent, for example, a graphite (e.g., natural graphite, artificial graphite, and expansive graphite), and carbon black-based materials such as acetylene black, and Ketjen black can be used.

A binder plays a role to tie active material particles, and for example, polyvinylidene fluoride (PVDF), polytetrafluoroethylene (PTFE), fluorocarbon rubber, ethylene propylene diene rubber, styrene-butadiene, cellulosic resin, polyacrylic acid and the like can be used.

In addition, if necessary, a solvent for dispersion of a positive electrode active material, a conductive agent, and activated carbon, and dissolution of a binder is added to the positive electrode composite material. As the solvent, specifically, an organic solvent such as N-methyl-2-pyrrolidone (NMP) can be used. Moreover, activated carbon can be added to the positive electrode composite material in order to increase electric double-layer capacity.

A powdery positive electrode active material, a conductive agent, and a binder are mixed, and if necessary, activated carbon and a solvent for the purpose of adjusting viscosity and the like are added, the mixture is kneaded, and thus a positive electrode composite material paste is prepared.

(4) Nonaqueous Electrolyte Secondary Battery

The nonaqueous electrolyte secondary battery of the present invention comprises a positive electrode, a negative electrode and a nonaqueous electrolytic solution, for example, and is composed of constitutive elements similar to those of a general nonaqueous electrolyte secondary battery. In addition, embodiments described below are merely given for illustrative purposes. The nonaqueous electrolyte secondary battery of the present invention can be implemented in forms for which various modifications and improvements have been made on the basis of embodiments described herein and the knowledges of persons skilled in the art. The applications of the nonaqueous electrolyte secondary battery of the present invention are not particularly limited.

(4.1) Positive Electrode

With the use of the positive electrode composite material paste of a nonaqueous electrolyte secondary battery obtained as described above, for example, a positive electrode of a nonaqueous electrolyte secondary battery is prepared as described below The positive electrode composite material paste is applied onto the surface of a charge collector made of an aluminium foil, for example, and then the surface is dried to scatter the solvent. If necessary, pressurization can also be performed using a roll press or the like for increasing the electrode density. In this manner, a sheet-shaped positive electrode can be prepared. Such a sheet-shaped positive electrode is cut into an appropriate size according to a target battery, and then can be provided for battery preparation. However, a method for preparing a positive electrode is not limited to the above example and another method can also be performed.

(4.2) Negative Electrode

The negative electrode to be used herein is formed by mixing a negative electrode active material, which is capable of insertion and de-insertion of lithium ions, or metal lithium, lithium alloys, and the like, with a binder, adding an appropriate solvent to produce a negative electrode composite material in the form of paste, applying the paste onto the surface of a charge collector of a metal foil such as copper, drying, and if necessary performing compression in order to increase the electrode density.

As the negative electrode active material, for example, an organic compound in a fired form, such as natural graphite, artificial graphite and phenol resin, and a carbon substance in a powdery form such as coke can be used. In this case, as a negative electrode binder, similarly to that for a positive electrode, a fluorine-containing resin such as PVDF can be used. As a solvent for dispersion of the active material and the binder, an organic solvent such as N-methyl-2-pyrrolidone can be used.

(4.3) Separator

A separator is placed between a positive electrode and a negative electrode so that it is sandwiched by the two. The separator separates the positive electrode from the negative electrode, so as to retain an electrolyte, for which a thin film of polyethylene, polypropylene or the like having numerous fine pores can be used.

(4.4) Nonaqueous Electrolytic Solution

The nonaqueous electrolytic solution is a solution in which a lithium salt is dissolved as a supporting electrolyte in an organic solvent.

As an organic solvent, one type selected from cyclic carbonates such as ethylene carbonate, propylene carbonate, butylene carbonate, and trifluoropropylene carbonate, and, chain carbonates such as diethyl carbonate, dimethyl carbonate, ethyl methyl carbonate and dipropyl carbonate, furthermore, ether compounds such as tetrahydrofuran, 2-methyl tetrahydrofuran and dimethoxyethane, sulfur compounds such as ethyl methyl sulfone and butanesultone, and phosphorus compounds such as triethyl phosphate and trioctyl phosphate can be used independently or 2 or more types thereof can be mixed and then used.

As supporting electrolytes, $LiPF_6$, $LiBF_4$, $LiClO_4$, $LiAsF_6$, $LiN(CF_3SO_2)_2$, and a composite salt thereof can be used, for example. Furthermore, a nonaqueous electrolytic solution may also contain a radical scavenger, a surfactant and a fire retardant, for example.

(4.5) Battery Shape and Composition

The nonaqueous electrolyte secondary battery of the present invention composed of a positive electrode, a negative electrode, a separator and a nonaqueous electrolytic solution described above may be formed into various shapes such as a cylindrical shape and a stacked shape.

Regardless of a shape to be employed, a positive electrode and a negative electrode are laminated via a separator to form an electrode body, the thus obtained electrode body is impregnated with a nonaqueous electrolytic solution, a positive electrode charge collector and a positive electrode terminal in communication with the outside are connected using a current collecting lead or the like and a negative electrode charge collector and a negative electrode terminal in communication with the outside are connected using the same, and the battery case containing these members therein is sealed, so that the assembly of the nonaqueous electrolyte secondary battery is completed.

EXAMPLES

Hereinafter, the present invention will be further described in detail with reference to examples and comparative examples of the present invention, but the present invention is not limited by these examples.

Example 1

A positive electrode material was prepared using a lithium metal composite oxide obtained by a known technique as a base material. Specifically, a composite hydroxide powder having a composition in which the ratio of Ni, Co, and Mn atoms is 1:1:1 and lithium carbonate were mixed and fired so as to satisfy Li/Me=1.03, thereby obtaining a lithium metal composite oxide. The lithium metal composite oxide and an ammonium tungstate powder were mixed together to satisfy the atomic ratio (Ni+Co+Mn):W=100 : 0.133, and then the mixture was mixed for 10 minutes using a shaker mixer (WAB, TURBULA T T2C) to prepare a positive electrode material.

[pH Measurement]

Five (5) g of the obtained positive electrode material was weighed, and then dissolved in 100 mL of pure water. After 10 minutes of stirring with a stirrer or the like, the mixture was left to stand for 30 minutes. The pH of the supernatant fluid at 25° C. was measured and was found to be 11.7.

[Analysis of Excessive Lithium]

Excessive lithium of the thus obtained positive electrode active material was evaluated by titrating Li eluted from the positive electrode active material. Pure water was added to the obtained positive electrode active material, the mixture was stirred for a certain period of time, and then filtered. The state of lithium compounds eluted at a point of neutralization that had emerged by the gradual addition of hydrochloric acid while measuring the pH of the filtrate was analyzed to evaluate the amount of excessive lithium. As a result, the amount of excessive lithium was 0.08 mass % with respect to the total amount of the positive electrode active material.

[Evaluation of Battery]

The obtained positive electrode material was evaluated by preparing batteries as described below and then measuring the charge and discharge capacity. FIG. 1 shows a side view of a battery used for evaluation. A section view is on the upper right in FIG. 1.

The positive electrode material (52.5 mg), 15 mg of acetylene black, and 7.5 mg of polytetrafluorinated ethylene resin (FIFE) were mixed, and then the mixture was press-formed with pressure of 100 MPa, so as to prepare a positive electrode 1 (electrode for evaluation) having a diameter of 11 mm and a thickness of 100 µm, as shown in FIG. 1. The thus prepared positive electrode 1 was dried in a vacuum dryer at 120° C. for 12 hours. Subsequently, a 2032 coin type battery B was prepared using the positive electrode 1 in a glove box in an Ar atmosphere where the dew point was controlled at −80° C.

For a negative electrode 2, Li metal with a diameter of 17 mm and a thickness of 1 mm was used. For an electrolytic solution, a 3:7 mixed solution (Tomiyama Pure Chemical Industries Co., Ltd.) containing ethylene carbonate (EC) and diethyl carbonate (DEC) at 3:7 with 1M $LiPF_6$ as a supporting electrolyte was used. For a separator 3, a polyethylene porous film having a film thickness of 25 µm was used. In addition the coin type battery B had a gasket 4 and a wave washer 5, and was assembled with a positive electrode can 6 and a negative electrode can 7 into a coin-shaped battery.

The thus prepared coin type battery was subjected to a charge and discharge test, by which the battery was left to stand for 24 hours after assembly, after the open circuit voltage (OCV) was stabilized, the positive electrode was charged with a current density of 0.1 mA/cm2 until the cutoff voltage reached 4.8 V, 1 hour of quiescent time was provided, discharging was performed to a cutoff voltage of 2.0 V, and then the discharge capacity was measured. In this manner, the initial discharge capacity was evaluated.

[Evaluation of Positive Electrode Composite Material Paste]

Positive electrode composite material paste to be used for evaluation was prepared as follows. In a dry room controlled to have a dew point of −30° C. or lower, the obtained positive electrode material, a conductive aid material, and a binder were kneaded so that the solid mass ratio was 91:6:3 using a planetary centrifugal mixer (Thinky Mixer (Awatorirentaro), Thinky Corporation, Model: ARE-310). As the binder, a PVDF solution with a functional group (KUREHA Corporation, NMP solution type model #L9305) was used. Subsequently, an appropriate amount of NMP (KANTO Chemical Co., Inc., dehydrated grade) was added, and then the mixture was kneaded using the mixer, so that a positive electrode composite material paste with desired viscosity was obtained. The obtained paste was left to stand for 24 hours, viscosity was measured at a shear rate of 1/50 s using a viscometer (Brookfield, DV-II+PRO). For comparison, viscosity immediately after paste preparation was similarly measured. Gelation was evaluated by visually observing and examining the paste by the touch after the paste had been left to stand for 24 hours following preparation. A pass/fail judgement was made by determining a flowable paste as ○ (pass) and a jellied paste as ×(fail).

Example 2

Except for mixing ammonium tungstate so as to satisfy the ratio (Ni+Co+Mn):W=100:0.278, a positive electrode material was obtained in a manner similar to Example 1. The positive electrode material was evaluated similarly to Example 1.

Example 3

Except for mixing ammonium tungstate so as to satisfy the ratio (Ni+Co+Mn):W=100:0.366, a positive electrode material was obtained in a manner similar to Example 1. The positive electrode material was evaluated similarly to Example 1.

Comparative Example 1

A lithium metal composite oxide obtained in Example 1, in which no ammonium tungstate had been mixed therewith, was evaluated as a positive electrode material in a manner similar to that in Example 1.

Comparative Example 2

Except for mixing with tungsten oxide so as to satisfy the atom ratio of (Ni+Co+Mn):W=100:3.78, a positive electrode material was obtained in a manner similar to that in Example 1. The positive electrode material was evaluated similarly to Example 1.

Comparative Example 3

Except for mixing with ammonium tungstate so as to satisfy the atom ratio of (Ni+Co+Mn):W=100:2.780, a positive electrode material was obtained in a manner similar to that in Example 1. The positive electrode material was evaluated similarly to Example 1.

The results of measuring the pH of the positive electrode materials of Examples 1 to 3 and Comparative example 1 and the results of evaluating the positive electrode paste of the same are shown in Table 1.

As is understood from the results in Table 1, the positive electrode materials in which the pHs of supernatant fluids had been controlled by mixing of the lithium metal composite oxide with ammonium tungstate exhibited an inhibited increase in the viscosity of the paste, and prevented gelation.

On the other hand in Comparative example 1, in which no ammonium tungstate had been added, the supernatant fluid had a high pH, and the paste underwent gelation.

In Comparative example 2, the amount of tungsten oxide added was high in order to control the pH of a supernatant fluid within a proper range. Accordingly, lithium conduction between lithium metal composite oxide and an electrolytic solution was inhibited, resulting in decreased discharge capacity.

In Comparative example 3, the pH of a supernatant fluid was less than 11.2, the amount of ammonium tungstate added was high. It was thus considered that lithium was excessively eliminated from the lithium metal composite oxide, resulting in decreased discharge capacity.

INDUSTRIAL APPLICABILITY

It is essential to reduce the cost of a lithium ion secondary battery for the spread of the battery as a power supply for electric vehicles. The use of the positive electrode active material of the present invention makes it possible to improve the yield and to reduce the cost, and thus its industrial value can be said to be extremely high.

REFERENCE SIGNS LIST

1 Positive electrode (electrode for evaluation)
2 Li metal negative electrode
3 Separator
4 Gasket
5 Wave washer
6 Positive electrode can
7 Negative electrode can
B Coin type battery

The invention claimed is:
1. A positive electrode material for a nonaqueous electrolyte secondary battery, which comprises a mixture containing a lithium metal composite oxide represented by a general formula $Li_aNi_{1-x-y-z}Co_xMn_yM_zO_2$ (wherein, $0.03 \leq x \leq 0.35$, $0 \leq y \leq 0.35$, $0 \leq z \leq 0.05$, $0.97 \leq a \leq 1.30$, and M is at

TABLE 1

| | Positive electrode material | | | Evaluation of paste | | |
|---|---|---|---|---|---|---|
| | | | Discharge | | | |
| | Element | | capacity | Viscosity of paste | | Determination |
| | added | pH | (mAh/g) | 0 hr | 24 hr | of gelation |
| Example 1 | Ammonium tungstate | 11.7 | 154.2 | 6936 | 8030 | ○ |
| Example 2 | Ammonium tungstate | 11.5 | 152.6 | 6587 | 7362 | ○ |
| Example 3 | Ammonium tungstate | 11.3 | 151.9 | 6621 | 7129 | ○ |
| Comparative example 1 | — | 12.1 | 155.7 | 6725 | 16569 | x |
| Comparative example 2 | Tungsten oxide | 11.6 | 143.2 | 6866 | 7501 | ○ |
| Comparative example 3 | Ammonium tungstate | 10.9 | 140.1 | 6213 | 7052 | ○ | least one element selected from V, Fe, Cu, Mg, Mo, Nb, Ti, Zr, W and Al), and an ammonium tungstate powder, wherein the positive electrode material is characterized such that when 5 g of the positive electrode material is mixed with 100 ml of pure water, the mixture is stirred for 10 minutes and then left to stand for 30 minutes, and then the pH of a supernatant fluid at 25° C. is measured, the pH ranges from 11.2 to 11.8.

2. The positive electrode material for a nonaqueous electrolyte secondary battery according to claim 1, wherein the mixture further contains lithium tungstate.

3. The positive electrode material for a nonaqueous electrolyte secondary battery according to claim 2, wherein the amount of lithium contained in lithium compounds other than the lithium tungstate present on the surface of the lithium metal composite oxide and, is 0.1 mass % or less with respect to the lithium metal composite oxide.

4. The positive electrode material for a nonaqueous electrolyte secondary battery according to claim 2, wherein the lithium tungstate is present on the surface of the lithium metal composite oxide.

5. The positive electrode material for a nonaqueous electrolyte secondary battery according to claim 2, wherein the lithium tungstate is present n the form of $Li_2WO_4$, $Li_4WO_5$, $Li_6WO_6$, $Li_2W_4O_{13}$, $Li_2W_2O_7$, $Li_6W_2O_9$, $Li_2W_2O_7$, $Li_2W_5O_{16}$, $Li_{19}W_{19}O_{55}$, $Li_3W_{10}O_{30}$, $Li_{18}W_5O_{15}$, or a hydrate thereof.

6. The positive electrode material for a nonaqueous electrolyte secondary battery according to claim 1, wherein the atomic ratio of tungsten contained in the ammonium tungstate powder ranges from 0.05 to 0.4 percent with respect to the total number of Ni, Co, Mn and M atoms contained in the lithium metal composite oxide.

7. The positive electrode material for a nonaqueous electrolyte secondary battery according to claim 2, wherein the atomic ratio of tungsten and the lithium tungstate contained in the ammonium tungstate powder ranges from 0.05 to 0.4 percent with respect to the total number of Ni, Co, Mn and M atoms contained in the lithium metal composite oxide.

8. A positive electrode composite material paste, which contains the positive electrode material for a nonaqueous electrolyte secondary battery according to claim 1.

9. A nonaqueous electrolyte secondary battery, which has a positive electrode containing the positive electrode material for a nonaqueous electrolyte secondary battery according to claim 1.

10. A method for producing a positive electrode material for a nonaqueous electrolyte secondary battery, which comprises a step of mixing: a lithium metal composite oxide comprising primary particles represented by a general formula $Li_aNi_{1-x-y-z}Co_xMn_yM_zO_2$ (wherein, $0.03 \leq x \leq 0.35$, $0 \leq y \leq 0.35$, $0 \leq z \leq 0.05$, $0.97 \leq a \leq 1.30$, and M is at least one type of element selected from V, Fe, Cu, Mg, Mo, Nb, Ti, Zr, W and Al) and secondary particles formed by aggregation of the primary particles; and an ammonium tungstate powder, wherein
the ammonium tungstate powder is mixed such that when 5 g of the positive electrode material is mixed with 100 ml of pure water, the mixture is stirred for 10 minutes and then left to stand for 30 minutes, and then the pH of the supernatant fluid at 25° C. is measured, the pH ranges from 11.2 to 11.8.

11. A positive electrode composite material paste, which contains the positive electrode material for a nonaqueous electrolyte secondary battery according to claim 2.

12. A positive electrode composite material paste, which contains the positive electrode material for a nonaqueous electrolyte secondary battery according to claim 3.

13. A positive electrode composite material paste, which contains the positive electrode material for a nonaqueous electrolyte secondary battery according to claim 4.

14. A positive electrode composite material paste, which contains the positive electrode material for a nonaqueous electrolyte secondary battery according to claim 5.

15. A positive electrode composite material paste, which contains the positive electrode material for a nonaqueous electrolyte secondary battery according to claim 6.

16. A positive electrode composite material paste, which contains the positive electrode material for a nonaqueous electrolyte secondary battery according to claim 7.

17. A nonaqueous electrolyte secondary battery, which has a positive electrode containing the positive electrode material for a nonaqueous electrolyte secondary battery according to claim 2.

18. A nonaqueous electrolyte secondary battery, which has a positive electrode containing the positive electrode material for a nonaqueous electrolyte secondary battery according to claim 3.

19. A nonaqueous electrolyte secondary battery, which has a positive electrode containing the positive electrode material for a nonaqueous electrolyte secondary battery according to claim 4.

20. A nonaqueous electrolyte secondary battery, which has a positive electrode containing the positive electrode material for a nonaqueous electrolyte secondary battery according to claim 5.

21. A nonaqueous electrolyte secondary battery, which has a positive electrode containing the positive electrode material for a nonaqueous electrolyte secondary battery according to claim 6.

22. A nonaqueous electrolyte secondary battery, which has a positive electrode containing the positive electrode material for a nonaqueous electrolyte secondary battery according to claim 7.

* * * * *